(12) United States Patent
Chen

(10) Patent No.: US 10,756,645 B1
(45) Date of Patent: Aug. 25, 2020

(54) ELECTRICAL POWER CONVERSION SYSTEM, CONTROL METHOD AND BRIDGE RECTIFIER

(71) Applicant: Alpha and Omega Semiconductor (Cayman) Ltd., Grand Cayman (KY)

(72) Inventor: Ming-Hsueh Chen, Hsinchu (TW)

(73) Assignee: ALPHA AND OMEGA SEMICONDUCTOR (CAYMAN) LTD., Grand Cayman (KY)

( * ) Notice: Subject to any disclaimer, the term of this patent is extended or adjusted under 35 U.S.C. 154(b) by 0 days.

(21) Appl. No.: 16/588,744

(22) Filed: Sep. 30, 2019

(51) Int. Cl.
*H02M 7/217* (2006.01)
*H02M 7/219* (2006.01)
*H02M 1/08* (2006.01)
*H02M 1/00* (2006.01)

(52) U.S. Cl.
CPC .......... *H02M 7/219* (2013.01); *H02M 1/081* (2013.01); *H02M 2001/007* (2013.01)

(58) Field of Classification Search
CPC .......... H02M 7/02; H02M 7/21; H02M 7/217; H02M 7/219; H02M 1/081; H02M 2001/007
See application file for complete search history.

(56) References Cited

U.S. PATENT DOCUMENTS

| | | |
|---|---|---|
| 8,804,389 B2 | 8/2014 | Heath et al. |
| 9,712,078 B2 | 7/2017 | Zhang |
| 9,843,251 B2 | 12/2017 | Hong et al. |
| 2011/0199799 A1* | 8/2011 | Hui .......... H02M 7/06 363/127 |
| 2015/0117076 A1* | 4/2015 | Zhang .......... H02M 7/219 363/127 |
| 2016/0380555 A1* | 12/2016 | Kang .......... H02M 7/219 363/89 |
| 2018/0097451 A1* | 4/2018 | Morin .......... H02M 7/06 |
| 2018/0191152 A1* | 7/2018 | Ishimaru .......... H02M 7/219 |
| 2018/0198396 A1* | 7/2018 | Hayashi .......... H02P 11/06 |
| 2019/0319528 A1* | 10/2019 | Matsuura .......... H02M 1/088 |
| 2019/0326810 A1* | 10/2019 | Hashimoto .......... H02M 1/4233 |

\* cited by examiner

*Primary Examiner* — Adolf D Berhane
(74) *Attorney, Agent, or Firm* — Chen-Chi Lin

(57) ABSTRACT

A power conversion system includes a bridge switch circuit. The bridge switch circuit includes a plurality of switch sub-circuits, each switch sub-circuit includes: a switch for controlling switching of the switch sub-circuit; and a control unit configured to perform the following control cycle: When the voltage between the switch and the cathode is less than the first voltage threshold and the switch sub-circuit is not charged, the control unit controls the switch to be turned on, and starts charging the switch sub-circuit. When the voltage between the switch and the cathode is greater than a second voltage threshold, the control unit controls the switch to be turned off. When the charging voltage of the control unit is greater than the third voltage threshold, the control unit stops charging the switch sub-circuit. The circuit structure is simple and the circuit energy loss of the bridge rectifier is reduced.

20 Claims, 6 Drawing Sheets

ELECTRICAL POWER CONVERSION SYSTEM, CONTROL METHOD AND BRIDGE RECTIFIER

FIELD OF THE INVENTION

This invention relates generally to circuit switching. More particularly, the present invention relates to an electrical power conversion system, a control method and a bridge rectifier.

BACKGROUND OF THE INVENTION

An AC/DC power converter is an electrical power conversion unit to convert alternating current (AC) into direct current (DC). In an AC/DC power converter, bridge rectifier circuit is often applied to act as the AC/DC power conversion system.

However, a conventional current bridge rectifier circuit has a relatively complicated construction, and the energy loss in circuit switching is relatively high. In one example, a type of bridge rectifier, disclosed in U.S. Pat. No. 9,843,251, requires applying bridge circuit's external signal to drive the bridge switch's gate, with a relatively complicated circuit structure and higher construction cost. In another example, a type of bridge rectifier, disclosed in U.S. Pat. No. 8,804,389, requires applying an ultrahigh voltage (UHV) process for controller and needs extra high voltage level shift circuits thereby causing high circuit energy loss. In other words, in the conventional solution, the bridge rectifier circuit usually performs extra switching operations within AC cycle, and the charging process is normally implemented within high voltage cycle, thereby increasing circuit energy loss and higher operation cost of the circuit.

SUMMARY OF THE INVENTION

An electrical power conversion system comprises a bridge switching circuit, a switch, and a control unit. A control method comprises detecting a bridging voltage, comparing the detected bridging voltage with a preset first voltage threshold, turning the switch on, comparing the detected bridging voltage with a preset second voltage threshold, turning the switch off, and conditionally stopping charging the switching sub-circuit.

DETAILED DESCRIPTION OF THE INVENTION

A technical solution of an electrical power conversion system is now provided to overcome the existing problems in the current technology. This electrical power conversion system is applicable to AC/DC power converter, specifically including one bridge switching circuit, where the input terminals of this circuit connected to the AC input terminals of the electrical power conversion system, and the output terminals of this circuit connected to the DC output terminals of the electrical power conversion system, respectively.

The bridge switching circuit includes several switching sub-circuits, each of them with its anode respectively connected to one of the AC input terminal and DC output terminal, and with its cathode respectively connected to another one of these two terminals.

Each switching sub-circuit includes a switch and a control unit. The switch, connected between the anode and cathode of the switching sub-circuit, used to control on/off of the sub-circuit. The control unit, connected to the switch, which is configured to implementing the following control cycle.

When the voltage between the switch and the cathode is below the preset first voltage threshold and the switching sub-circuit is not yet charged by the control unit, the control unit will control the switch to switch it on. Then after the switch is turned on, the control unit will enter an allowed charging mode and it will be allowed to charge the switching sub-circuit.

When the voltage between the switch and the cathode is above the preset second voltage threshold, the control unit will control the switch to switch it off.

When the charging voltage of the control unit is above the preset third voltage threshold, the control unit will stop charging the switching sub-circuits.

Figure 1:
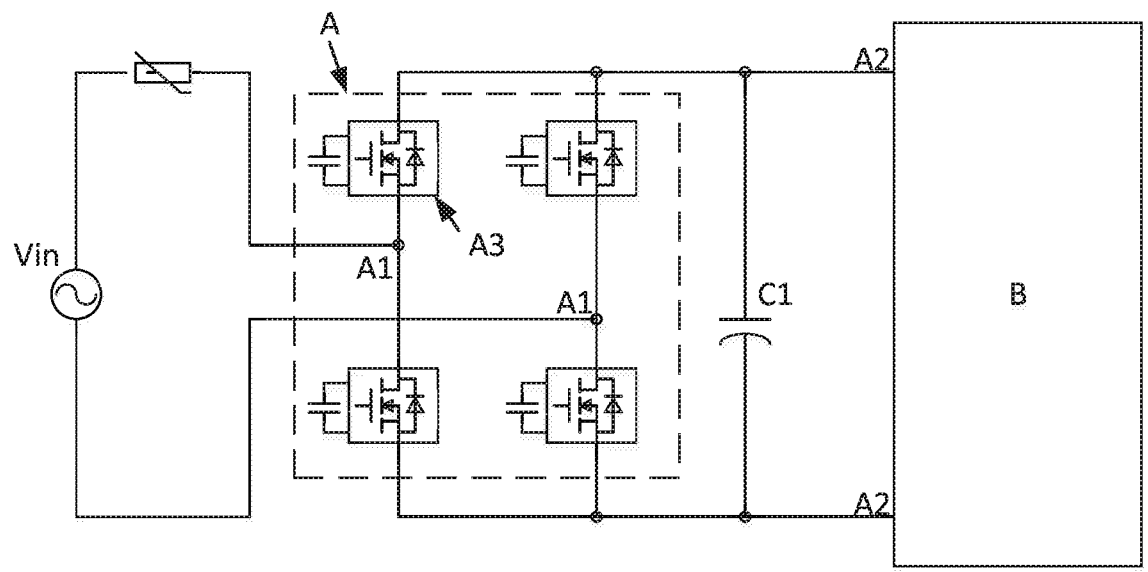
FIG. 1 is a schematic diagram of a detailed structure of an electrical power conversion system in examples of the present disclosure.

Referring now to FIG. 1, an electrical power conversion system includes a bridge switching circuit A. The input terminal A1 of the bridge switching circuit A is connected with the external AC input terminal Vin. The output terminal A2 of the bridge switching circuit A acts as DC output terminal of the electrical power conversion system, which is connected to an external load B and used to output the converted DC to this external load B. An electrolytic capacitor C1 is connected between the DC output terminals A2, which acts as the power supply filter.

The bridge switching circuit A includes a predetermined number of switching sub-circuits A3. In one example, 4 switching sub-circuits in the form of bridging connections are shown in FIG. 1. The structure and control logic of each switching sub-circuit A3 are the same. The sub-circuits are mutually independent of one another. A control logic of a selected sub-circuit is not influenced by the control logic of other sub-circuits.

Figure 2:
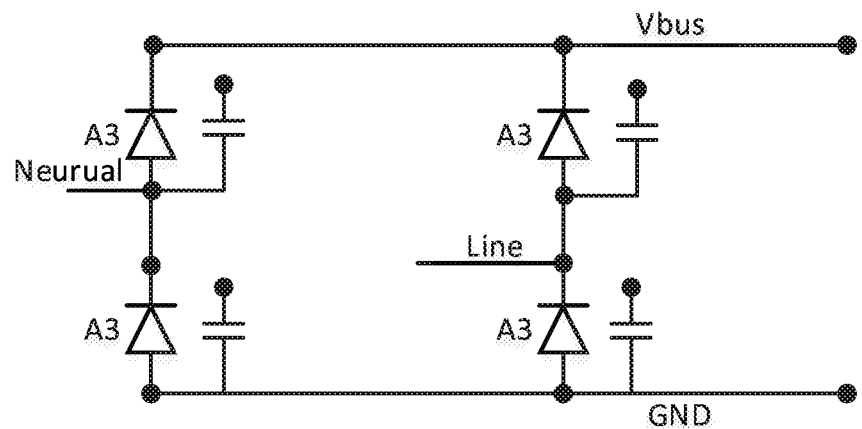
FIG. 2 is a schematic diagram of a simplified circuit structure of an electrical power conversion system in examples of the present disclosure.

The bridge switching circuit A of FIG. 1 can be simplified into the circuit structure as shown in FIG. 2. In the circuit structure of FIG. 2, within the AC cycle, each switching sub-circuit A3 can only switch on/off once. The detailed principles are described in referring to FIG. 3.

Figure 3:
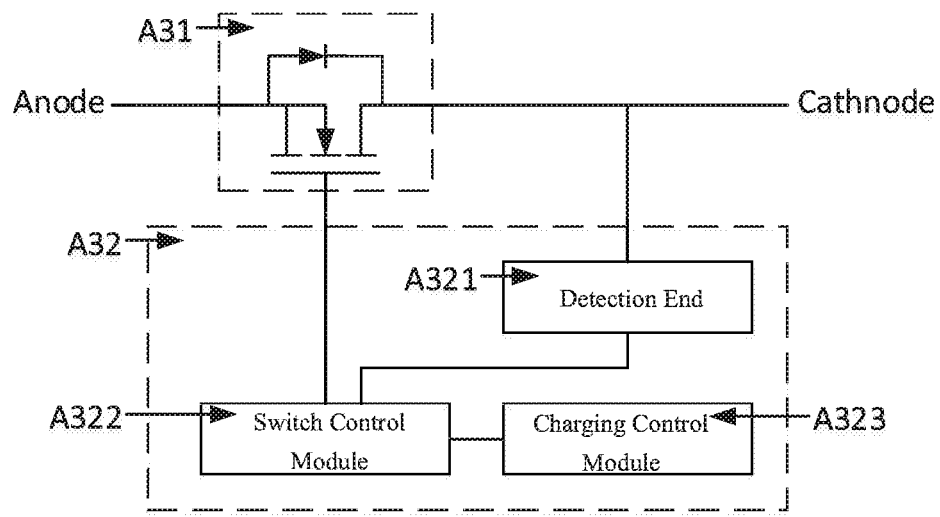
FIG. 3 is a module schematic diagram of a switching sub-circuit in examples of the present disclosure.

As shown in FIG. 3, in terms of single switching sub-circuit, the switching sub-circuits A3 each includes a switch A31 and a control unit A32. The switch A31, connected between the anode and the cathode of the switching sub-circuit A3, used to control switch on/off of this sub-circuit.

The control unit A32, connected to switch A31. The control unit A32 is configured as implementing the following control cycle:

When the voltage between the switch A31 and the cathode is below the preset first voltage threshold and the switching sub-circuit is not yet charged by the control unit, the control unit A32 will control the switch to switch it on. Then, after switch A31 is turned on, the control unit A32 will enter an allowed charging mode and will start to charge the switching sub-circuit A3 afterwards.

When the charging voltage of the control unit A32 is above the preset third voltage threshold, the control unit A32 will stop charging the switching sub-circuits A3.

In examples of the present disclosure, a control unit A32 and a switch A31 are set within each switching sub-circuit A3. The switch A31 is used to control switch on/off of this switching sub-circuit A3 while the control unit A32 is used to control switch on/off of the switch A31 thus to control switch on/off of the whole switching sub-circuit A3.

Within one AC cycle, the control unit A32 will first detect the voltage between the switch A31 and the cathode, and determine whether it is below the preset first voltage threshold (this first voltage threshold is a negative voltage). When the voltage is below the first voltage threshold (now within the negative half cycle of AC), the control unit A32 will control the switch A31 to switch it on. Now the switching sub-circuit A3 is switched on while the control unit A32 enters the allowed charging mode and charge this switching sub-circuit A3 afterwards. Therefore, this charging process is to be carried out in low voltage environment, capable of reducing the circuit energy loss during the charging process. Since the charging start of the control unit A32 and the switching on of the switch A31 does not always occur at the same time, generally speaking, the control unit A32 will start to charge the switching sub-circuit A3 only after switching on the switch A31. Therefore, in this application, the control unit A32 will enter the allowed charging mode when the switch A31 is switched on, which means that the control unit A32 will be able to charge the switching sub-circuit A3 subsequently.

Next, the control unit A32 will go on detecting the voltage between the switch A31 and the cathode. Since the switch A31 is already switched on, what the control unit A32 has actually detected is the voltage between anode and cathode of the switching sub-circuit A3. The control unit A32 will determine whether this voltage is above the preset second voltage threshold (this threshold is a positive voltage). When this voltage is above the second voltage threshold (now within the positive half cycle of AC), the control unit A32 will control the switch A31 to switch it off. Next, when the charging voltage of the control unit A32 to the switching sub-circuit A3 is above the preset third voltage threshold (this threshold is a positive voltage), the control unit A32 will stop charging the switching sub-circuit A3, and A3 will enter the discharging phase. Next, the control unit A32 will go on detecting voltage between the switch A31 and the cathode, waiting for it to become below the first voltage threshold.

The above mentioned process will be performed in a cycle, thus enabling each switching sub-circuit A3 to form a circulating working flow of "switch on→start to charge→switch off→stop charging→switch on", thereby allowing the switching sub-circuit A3 to operate a process with multiple state changes (multiple bursts), and to reduce the circuit energy loss.

Furthermore, in the above mentioned process, each switching sub-circuit A3 will switch on and off only once within the AC cycle, and the charging process will always be carried out in low voltage environment, which will also reduce the circuit energy loss.

Figure 4:
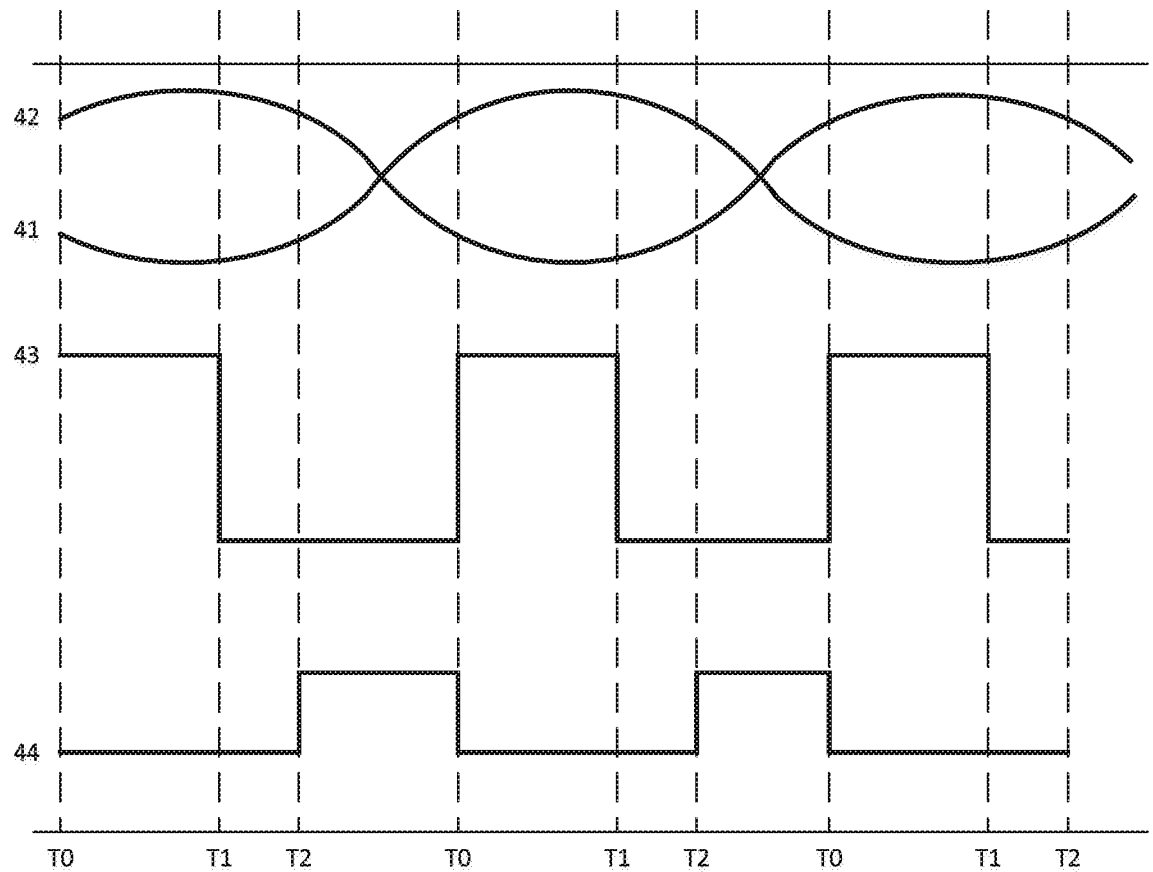
FIG. 4 is a waveform diagram of the electrical power conversion system in examples of the present disclosure.

The above mentioned process can also be demonstrated from the timing diagram of FIG. 4. In FIG. 4, curve 41 is used to indicate the firing line voltage changes in single phase AC. Curve 42 is used to indicate the neutral line voltage changes in single phase AC. Curve 43 is used to indicate the switch on/off changes of the switch. Curve 44 is used to indicate the charging control changes of the control unit.

At time T0, the control unit detects a voltage below the preset first voltage threshold when it is within negative half cycle of AC. The switch is on and the control unit enters the allowed charging mode and starts to charge afterwards.

In duration T0-T1, when the switch is in on state, and the control unit detects in real time the current direction between the anode and the cathode.

At time T1, the current direction changes, and the control unit detects that the voltage is above the preset second voltage threshold, when it is within positive half cycle of AC and the switch is off.

In duration T1-T2, when the switch is in off state, the blocking voltage in the switching sub-circuit A3 increases and the control unit continues to charge this sub-circuit.

At time T2, when the charging voltage Vcc output by the control unit is above the third voltage threshold, the control unit stops charging.

In duration T2-T0, when the switch is in off state, the control unit is in stop charging state. The control unit detects in real time whether the voltage is below the preset first voltage threshold and it will return to time T0 action when it is so, thereby realizing the circular execution of the circuit running process in duration T0-T2.

Figure 5:
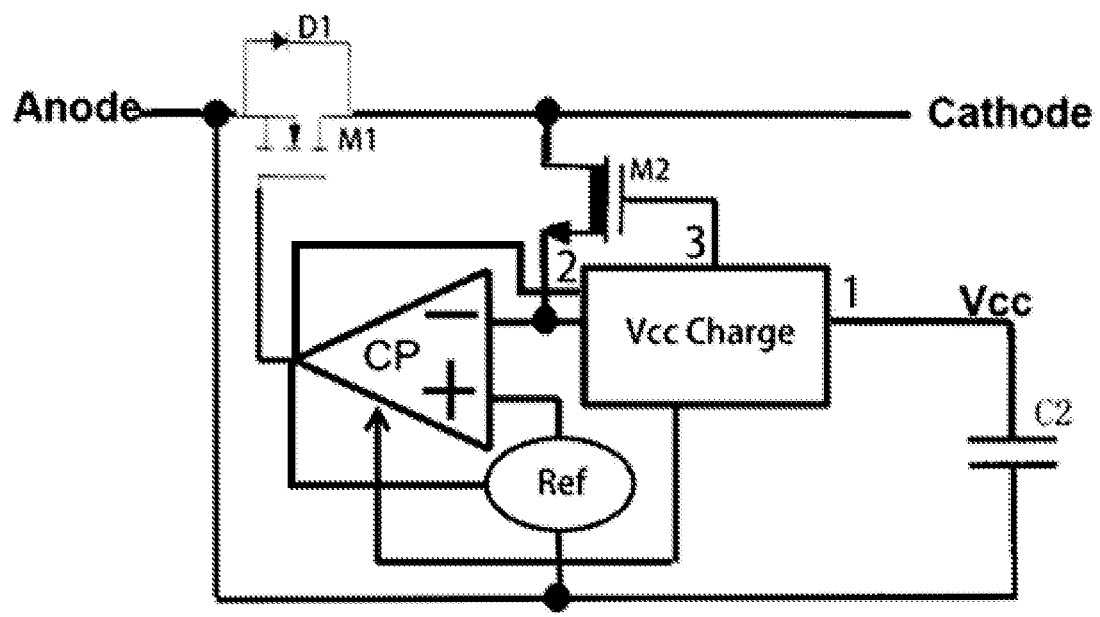
FIG. 5 is a schematic diagram of the switching sub-circuit in examples of the present disclosure.

In examples of the present disclosure, as shown in FIGS. 3 and 5, the switch A31 applies the first MOS transistor M1 for formation, with the first MOS transistor M1's drain connected to the anode of the switching sub-circuit. The first MOS transistor M1's source is connected to the cathode of the switching sub-circuit. The first MOS transistor M1's gate is connected to the control unit A32;

There is also a parasitic diode D1 bridged between the source and drain of the first MOS transistor M1.

Then the control unit A32 controls on/off state of the first MOS transistor M1 via controlling its grid voltage.

In examples of the present disclosure, the first MOS transistor M1 is a NMOS transistor. In examples of the present disclosure, the first MOS transistor's gate voltage is clamped to a fixed voltage value.

In examples of the present disclosure, as shown in FIG. 3, the control unit A32 includes a detection block A321, a switching control module A322 and a charging control module A323.

The detection block A321 is connected to the first MOS transistor and the cathode of the switching sub-circuit, used to detect and obtain the bridging voltage between the first MOS transistor and the cathode of the switching sub-circuit. The switching control module A322, which is respectively connected to the detection end and the control end of the first MOS transistor, used to:

Compare the bridging voltage with the first voltage threshold. When the bridging voltage is below the first voltage threshold and the control unit has not yet started charging the switching sub-circuit, the switching control module A322 controls the first MOS transistor via the control end of it and switch it on.

Compare the bridging voltage with the second voltage threshold. When the bridging voltage is above the second voltage threshold, the switching control module A322 will control the first MOS transistor via its control end to switch it off.

The charging control module A323, which is connected to the switching control module A322, is used to enter the allowed charging mode after the switching control module A322 controls the first MOS transistor and switches it on. Then, the charging will start and it will stop when the charging voltage reaches the third voltage threshold.

In examples of the present disclosure, the switching control module A322 applies a comparator CP to realize the process.

The normal phase input terminal of comparator CP is connected to a reference voltage module Ref with preset first voltage threshold and second voltage threshold.

The reverse phase input terminal of comparator CP is connected to the detection block A321.

The output terminal of comparator CP is connected to the control end of the switch.

To detection end applies the second MOS transistor M2 for implementation, with its drain connected between the switch and the cathode of the switching sub-circuit. A source of the second MOS transistor M2 is connected to the switching control module. A gate of the second MOS transistor M2 is connected to the charging control module. The second MOS transistor M2 is normally on, which is a PMOS transistor.

As shown in FIG. 5, the charging control module A323 comprises a charging control chip Vcc Charge, a charging capacitor C2, a comparator CP, and a reference voltage module Ref.

The charging control chip Vcc Charge, with its control end 3 connected to the gate of the second MOS transistor M2, and its charging end 1 connected to a charging capacitor C2. The other end of this charging capacitor C2 is connected between the switch and the anode of the switching sub-circuit. The output terminal 2 of the charging control chip Vcc Charge is connected to the output terminal of comparator CP, so as to provide the first MOS transistor M1 with a gate voltage when the comparator CP outputs high level, which is equivalent to the charging voltage Vcc output by the charging control chip;

When the switch M1 is switched on, the charging control chip Vcc Charge will charge the charging capacitor C2 via charging end 1. When the charging voltage of charging end 1 is above the third voltage threshold, it will stop charging.

The detailed circuit structure of each switching sub-circuit A3 is as shown in FIG. 5. In examples of the present disclosure, the first MOS transistor M1 acts as the switch of the switching sub-circuit A3, with its source and drain respectively connected to the anode and cathode of this sub-circuit, the gate of the first MOS transistor M1 (namely the control end of the switch) connected to the output terminal of comparator CP. Next, the output terminal 2 of the charging control chip Vcc Charge is connected to the output terminal of comparator CP. The normal phase input terminal of comparator CP is connected to a reference voltage module Ref, within which two reference voltage thresholds, namely the first voltage threshold and the second voltage threshold, is set. Among which, the first voltage threshold is a negative one and the second voltage threshold is a positive one. One feedback end of this reference voltage module Ref is also connected to the output terminal of comparator CP. The reverse phase input terminal of comparator CP is connected to one source of the second MOS transistor M2, namely the source of the second MOS transistor M2 acts as the input voltage of the reverse phase input terminal of comparator CP.

The initial first MOS transistor M1 is on off state. When the source and drain voltage of second MOS transistor M2 is below the first voltage threshold, the comparator CP outputs a high level, while the first MOS transistor M1 is switched on and the output terminal 2 of the charging control chip Vcc Charge provides the first MOS transistor M1 with gate voltage for its switching on. Next, the charging control chip Vcc Charge enters the allowed charging mode, and starts to charge the charging capacitor C2 afterwards. Since it's just the beginning of the charging process, the gate voltage of the second MOS transistor M2 then is initially lower than the charging voltage Vcc, for example, 6 V.

Over time, the source and drain current generated after switching on the first MOS transistor M1 begins to reverse. When the voltage at the reverse phase input terminal of comparator CP is above the second voltage threshold, its output terminal outputs a low level, and the first MOS transistor M1 is switched off. Now the charging control chip Vcc Charge is still charging, and the gate voltage of the second MOS transistor M2 is lower than the third voltage threshold, for example, 12 V.

The charging control chip Vcc Charge will not stop charging until its continuous charging causes its charging voltage to be higher than the third voltage threshold. The control unit A32 continues to detect the bridging voltage of the first MOS transistor M1. When the voltage at the reverse phase output terminal of comparator CP is below the first voltage threshold, the first MOS transistor M1 will be switched on again and the above mentioned process will be performed in a cycle.

It should be noted that in the above mentioned charging process, the charging current flows into the charging control chip Vcc Charge via the source and drain of the second MOS transistor M2, thereby providing this control chip with charging.

In examples of the present disclosure, the value range of the first voltage threshold can be set as −400 mV~−100 mV, or preferably as −250 mV.

In examples of the present disclosure, the value range of the second voltage threshold can be set as 0 mV~−10 mV, or preferably as 1 mV.

In examples of the present disclosure, the third voltage threshold can be set as 15.6 V.

In examples of the present disclosure, the appropriate values of the above mentioned thresholds according to the actual circuit conditions can be set. In examples of the present disclosure, the reference voltage module Ref is connected to the output terminal of comparator CP via a feedback end, thereby enabling decision on its own output reference voltage threshold according to the high and low level changes output by the output terminal of comparator CP. For example, when the comparator CP outputs a high level (e.g., Vcc), the reference voltage module Ref outputs the first voltage threshold, namely to compare the first voltage threshold with the source and drain voltage of the second MOS transistor M2; when it outputs a low level (e.g., 0 V), the reference voltage module Ref outputs the second voltage threshold, namely to compare the second voltage threshold with the source and drain voltage of the second MOS transistor M2.

Moreover, to solve the switching power supply problems, some necessary on/off conditions are set at the same time in terms of the above mentioned process, for example:

When the voltage of the charging control chip Vcc Charge is below the fourth voltage threshold (e.g., 13 V) and the under voltage lock out has already been triggered for the switching sub-circuit, the charging control chip Vcc Charge will also start to charge.

When the bridging voltage of the first MOS transistor M1 has triggered the under voltage lock out of the switching sub-circuit, the first MOS transistor M1 will be switched off.

Figure 6:
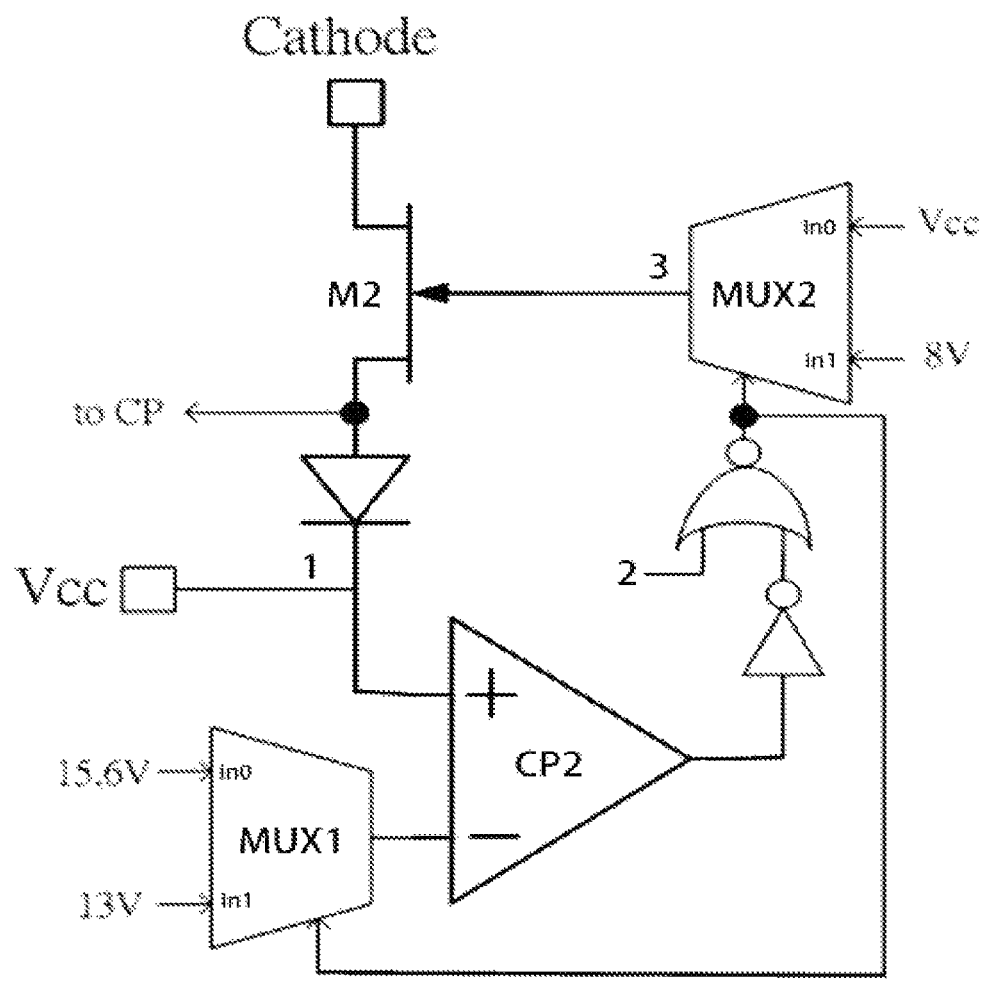
FIG. 6 is a schematic diagram of a circuit structure of the charge control chip in examples of the present disclosure.

FIG. 6 illustrates the internal circuit structure of the charging control chip Vcc Charge.

Two data selectors are set inside this charging control chip Vcc Charge. Among which, two input terminals of the first data selector MUX1 are respectively connected to reference voltage of the third voltage threshold (hereby set as 15.6 V) and the fourth voltage threshold (hereby set as 13 V), with the output terminal connected to a reverse phase input terminal of comparator CP2.

The source and drain voltage of the second MOS transistor M2 is connected to the reverse phase input terminal of comparator CP while at the same time. It is connected to the normal phase input terminal of comparator CP2 via a diode. Charging end 1 of this charging control chip Vcc Charge is led out from the normal phase input terminal of comparator CP2.

The output terminal of the comparator CP2 introduces the first input terminal of a NOR gate circuit after reversing via a NOT gate. The second input terminal of this NOR gate circuit is connected to the gate of the first MOS transistor M1 (namely output terminal 2 of the charging control chip Vcc Charge), and the output terminal of this NOR gate circuit is connected at the same time to the control end of the first data selector MUX1 and a control end of the second data selector MUX2.

Two input terminals of the second data selector MUX2 are respectively connected to reference voltage 8 V and charging voltage Vcc. Its output terminal is connected to the gate of the second MOS transistor M2 to provide it with the gate voltage required by its switching on.

Specifically, based on the internal circuit structure of the charging control chip Vcc Charge, the working principles of the first data selector MUX1 depends on the level fluctuation at its control end:

Only when the input signal at the first input terminal of the NOR gate circuit (namely the output signal of the first MOS transistor M1) comparator CP2 is 1 (logic high level) and that at the second input terminal of the NOR gate (namely the gate voltage of the first MOS transistor M1) is also 1 (logic high level), will the output terminal of the NOR gate output a first selection signal. Then the first data selector MUX1 will select 13.6 V to output according to this first selection signal.

In other cases, the output terminal of the NOR gate circuit outputs a second selection signal, and then the first data selector MUX1 selects 15 V to output according to this second selection signal.

Similarly, when the output terminal of the NOR gate circuit outputs the first selection signal, the second data selector MUX2 selects 8 V to output according to this first selection signal; when the output terminal of the NOR gate circuit outputs the second selection signal, the second data selector MUX2 selects Vcc to output according to this second selection signal. The function of the reference voltage 8 V is to clamp to the maximum charging voltage of the second MOS transistor M2, to avoid it to be charged to Vcc.

Figure 7:
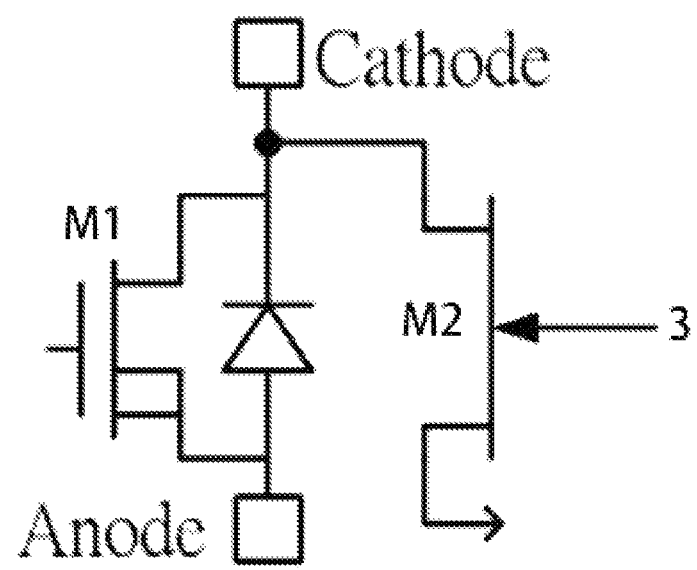
FIG. 7 is a schematic diagram of the circuit element comprising a first MOS transistor and a second MOS transistor in examples of the present disclosure.

In examples of the present disclosure, the first MOS transistor M1 and second MOS transistor M2 can also be combined to form a circuit element (as shown in FIG. 7).

The control principle of this circuit element is the same as that in the above embodiment. In conclusion, in the technical solution of the present disclosure, the cooperation between the switch A31 and the control unit A32 in terms of single switching sub-circuit A3 enables switch A3 to switch on/off only once within one AC cycle, and the charging process of the switching sub-circuit A3 only operates in low voltage environment, thus causing the reduction of circuit energy loss of the whole electrical power conversion system, and realizing a simple circuit and lower cost.

Figure 8:
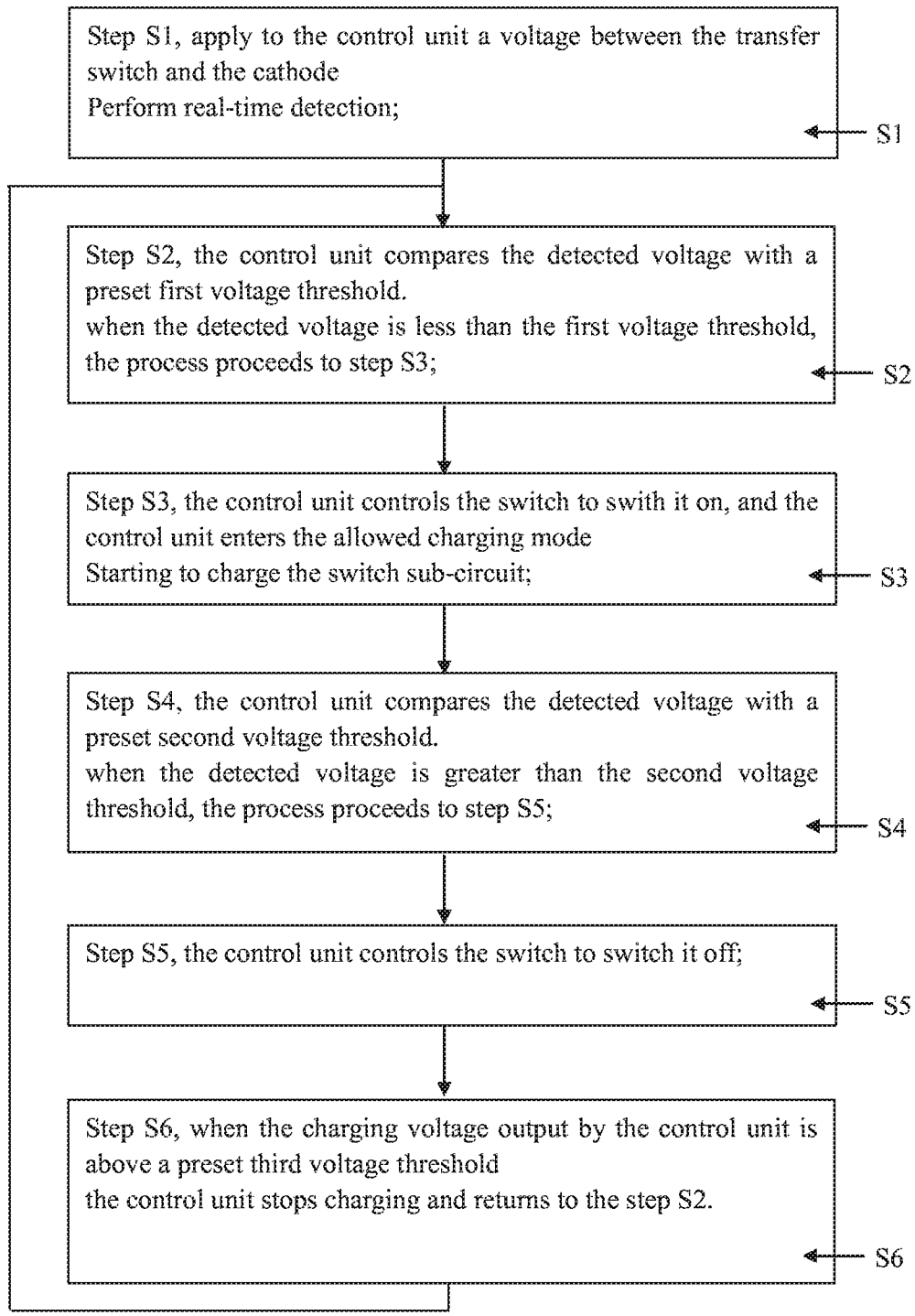
FIG. 8 is a flow diagram of a control method of an electrical power conversion system in examples of the present disclosure.

In examples of the present disclosure, a type of control method for the electrical power conversion system is provided now, as shown in detail in FIG. 8, including:

Step S1, apply the control unit the voltage between the switch and the cathode and perform real time detection.

Step S2, the control unit compares the detected voltage with the preset first voltage threshold, and will go to step S3 when the detected voltage is below the first voltage threshold.

Step S3, the control unit controls the switch to switch it on, and the control unit enters the allowed charging mode, then start to charge the switching sub-circuit.

Step S4, the control unit compares the detected voltage with the preset second voltage threshold, and will go to step S5 when the detected voltage is above the second voltage threshold.

Step S5, the control unit controls the switch to switch it off.

Step S6, when the charging voltage output by the control unit is above the preset third voltage threshold, it will stop charging and return to step S2.

In examples of the present disclosure, a type of bridge rectifier is also provided, which includes the above mentioned electrical power conversion system.

In examples of the present disclosure, a type of bridge rectifier is also provided, in which the above mentioned control method is applied.

Those of ordinary skill in the art may recognize that modifications of the embodiments disclosed herein are possible. For example, a total number of the sub-circuits may vary. Other modifications may occur to those of ordinary skill in this art, and all such modifications are deemed to fall within the purview of the present invention, as defined by the claims.

The invention claimed is:

1. An electrical power conversion system comprising:
   a bridge switching circuit comprising
      a plurality of switching sub-circuits each having an anode and a cathode connected respectively between an input terminal and an output terminal;
      wherein a pair of input terminals are configured to receive an AC input and a pair of output terminals are configured to provide a DC output;
      wherein each switching sub-circuit comprises:
         a switch connected between the anode and the cathode of the switching sub-circuit;
         a control unit connected to the switch;
         wherein the control unit is configured to execute the following control cycle:
            when a bridging voltage between the switch and the cathode is below a preset first voltage threshold and the control unit is not yet charging the switching sub-circuit, the control unit controls the switch to turn on, and the control unit enters a charging mode to charge the switching sub-circuit;

when the bridging voltage between the switch and the cathode is above a preset second voltage threshold, the control unit controls the switch to turn off; and when a charging voltage of the control unit is above a preset third voltage threshold, the control unit stops charging the switching sub-circuit.

2. The electrical power conversion system of claim 1, wherein the switch comprises a first MOS transistor comprising:
   a drain connected to the anode of the switching sub-circuit;
   a source connected to the cathode of the switching sub-circuit;
   a gate connected to the control unit; and
   a parasitic diode bridged between the source and the drain of the first MOS transistor.

3. The electrical power conversion system of claim 2, wherein the first MOS transistor is a NMOS transistor.

4. The electrical power conversion system of claim 2, wherein a gate voltage of the first MOS transistor is clamped to a fixed voltage value.

5. The electrical power conversion system of claim 2, wherein the control unit comprises:
   a detection block, connected to the first MOS transistor and the cathode of the switching sub-circuit, provided to obtain the bridging voltage between the first MOS transistor and the cathode of the switching sub-circuit;
   a switching control module, connected to the detection block and the gate of the first MOS transistor, provided to:
      compare the bridging voltage with the preset first voltage threshold, when the bridging voltage is below the preset first voltage threshold and the control unit is not charging the switching sub-circuit, the switching control mode turns the first MOS transistor on; and
      compare the bridging voltage with the preset second voltage threshold, when the bridging voltage is above the preset second voltage threshold, the switching control module turns the first MOS transistor off; and
   a charging control module, connected to the switching control module, provided to enter the charging mode when the switching control module turns the first MOS transistor on, and to stop charging when the charging voltage reaches the preset third voltage threshold.

6. The electrical power conversion system of claim 5, wherein the switching control module comprises
   a comparator;
      wherein a normal phase input of the comparator is connected to a reference voltage module preset with the preset first voltage threshold and the preset second voltage threshold;
      wherein a reverse phase input of the comparator is connected to the detection block; and
      wherein an output of the comparator is connected to the gate of the first MOS transistor.

7. The electrical power conversion system of claim 6, wherein the detection block comprises
   a second MOS transistor comprising
      a drain of the second MOS transistor connected to the switch and the cathode of the switching sub-circuit;
      a source connected to the switching control module; and
      a gate connected to the charging control module;

the second MOS transistor remains on for a predetermined duration.

8. The electrical power conversion system of claim 7, wherein the second MOS transistor is a PMOS transistor.

9. The electrical power conversion system of claim 7, wherein the charging control module comprises:
   a charging control chip comprising:
      a control terminal of the charging control chip connected to the gate of the second MOS transistor;
      a charging terminal of the charging control chip connected to a first terminal of a charging capacitor; a second terminal of the charging capacitor connected between the switch and the anode of the switching sub-circuit,
      an output terminal of the charging control chip connected to the reverse phase input terminal of the comparator;
   when the switch is turned on, the charging control chip charges the capacitor via the charging terminal;
   when the charging voltage of the charging terminal is above the preset third voltage threshold, the charging control chip stops charging.

10. The electrical power conversion system of claim 9, wherein the preset third voltage threshold is 15.6 V.

11. The electrical power conversion system of claim 1, wherein a value range of the preset first voltage threshold is from −450 mV to −100 mV.

12. The electrical power conversion system of claim 11, wherein the preset first voltage threshold is −250 mV.

13. The electrical power conversion system of claim 1, wherein a value range of the preset second voltage threshold is from 0 mV to 10 mV.

14. The electrical power conversion system of claim 13, wherein the preset second voltage threshold is 1 mV.

15. A method of controlling an electrical power conversion system comprising
   a bridge switching circuit including a plurality of switching sub-circuits each having an anode and a cathode connected respectively between an input terminal and an output terminal;
      wherein a pair of input terminals are configured to receive an AC input and a pair of output terminals are configured to provide a DC output;
   the method comprising the steps of:
      real time detecting a bridging voltage between a switch and the cathode of each of the plurality of the switching sub-circuits; and
      a plurality of looping cycles each comprising the sub-steps:
         comparing the detected bridging voltage with a preset first voltage threshold until the detected bridging voltage is below the first voltage threshold;
         turning the switch on and starting charging a corresponding switching sub-circuit;
         comparing the detected bridging voltage with a preset second voltage threshold until the detected bridging voltage is above the preset second voltage threshold;
         turning the switch off; and
         when a charging voltage of the corresponding switching sub-circuit is above a preset third voltage threshold, stop charging the corresponding switching sub-circuit.

16. The method of claim 15, wherein the switch comprises a NMOS transistor connected between the anode and the cathode; and wherein each switching sub-circuit further comprises a control unit connected to the NMOS.

17. The method of claim 16, wherein the control unit comprises:
- a detection block, connected to the NMOS transistor and the cathode of the switching sub-circuit, provided to obtain the bridging voltage between the NMOS transistor and the cathode of the corresponding switching sub-circuit;
- a switching control module, connected to the detection block and a gate of the NMOS transistor, provided to:
    - compare the bridging voltage with the preset first voltage threshold, when the bridging voltage is below the preset first voltage threshold and the control unit is not charging the switching sub-circuit, the switching control mode turns the NMOS transistor on; and
    - compares the bridging voltage with the preset second voltage threshold, when the bridging voltage is above the preset second voltage threshold, the switching control module turns the NMOS transistor off; and
- a charging control module, connected to the switching control module, provided to enter a charging mode when the switching control module turns the NMOS transistor on, and to stop charging when the charging voltage reaches the preset third voltage threshold.

18. The method of claim 17, wherein the switching control module comprises a comparator;
- wherein a normal phase input of the comparator is connected to a reference voltage module preset with the preset first voltage threshold and the preset second voltage threshold;
- a reverse phase input of the comparator is connected to the detection block; and
- an output of the comparator is connected to the gate of the NMOS transistor.

19. The method of claim 18, wherein the detection block comprises a PMOS transistor comprising
- a drain of the PMOS transistor connected to the switch and the cathode of the switching sub-circuit;
- a source connected to the switching control module; and
- a gate connected to the charging control module;
- wherein the PMOS transistor remains on for a predetermined duration.

20. The method of claim 19, wherein the charging control module comprises:
- a charging control chip, a control terminal of the charging control chip being connected to the gate of the PMOS transistor, a charging terminal of the charging control chip being connected to a first terminal of a charging capacitor, a second terminal of the charging capacitor being connected between the switch and the anode of the switching sub-circuit, an output terminal of the charging control chip being connected to the reverse phase input terminal of the comparator;
- when the switch is turned on, the charging control chip charges the capacitor via the charging terminal; and
- when the charging voltage of the charging terminal is above the preset third voltage threshold, the charging control chip stops charging.

\* \* \* \* \*